(12) United States Patent
Burriss et al.

(10) Patent No.: US 10,204,011 B1
(45) Date of Patent: Feb. 12, 2019

(54) TECHNIQUES FOR PARTIALLY RESTARTING A COMPUTING DEVICE IN RESPONSE TO A CONFIGURATION CHANGE

(71) Applicant: EMC IP Holding Company LLC, Hopkinton, MA (US)

(72) Inventors: Michael L. Burriss, Raleigh, NC (US); Roko Peros, Holly Springs, NC (US); Jochen F. De Smet, Shrewsbury, MA (US); Brion Patrick Philbin, North Grafton, MA (US); Kenneth D. Lee, Raleigh, NC (US); Yuri A. Stotski, St. Petersburg (RU); Jackson Brandon Myers, Cary, NC (US); Helga M. Sonner, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 202 days.

(21) Appl. No.: 15/199,117

(22) Filed: Jun. 30, 2016

(51) Int. Cl.
*G06F 11/00* (2006.01)
*G06F 11/14* (2006.01)
*G06F 9/455* (2018.01)

(52) U.S. Cl.
CPC ........ *G06F 11/142* (2013.01); *G06F 9/45558* (2013.01); *G06F 11/1438* (2013.01); *G06F 2009/45591* (2013.01); *G06F 2201/805* (2013.01); *G06F 2201/815* (2013.01); *G06F 2201/85* (2013.01)

(58) Field of Classification Search
CPC .................................................. G06F 11/1438

USPC ........................... 714/10, 13, 14, 22, 23, 24
See application file for complete search history.

(56) References Cited

U.S. PATENT DOCUMENTS

| | | | |
|---|---|---|---|
| 6,965,989 B1* | 11/2005 | Strange ..................... | G06F 1/24 709/220 |
| 7,130,870 B1* | 10/2006 | Pecina ................ | G06F 11/1433 |
| 7,783,886 B2* | 8/2010 | Walmsley ........... | B41J 2/04505 713/176 |
| 8,151,021 B1 | 4/2012 | Glade et al. | |
| 8,826,264 B1 | 9/2014 | Chhabra et al. | |
| 9,092,290 B1 | 7/2015 | Bono et al. | |

(Continued)

OTHER PUBLICATIONS

Brandon Myers, et al.; "Reboot System and Method," U.S. Appl. No. 141871,740, filed Sep. 30, 2015.

(Continued)

*Primary Examiner* — Dieu Minh T Le
(74) *Attorney, Agent, or Firm* — BainwoodHuang

(57) ABSTRACT

A method of initializing a computing device is provided. The method includes (a) powering up the computing device, (b) initially setting a flag to indicate no need to reboot the computing device, (c) sequentially starting a set of computing components operating on the computing device, (d) in response to one component of the set making a configuration change to the computing device, setting a flag to indicate a need to partially reboot the computing device, and (e) upon all components of the set of components completing to load, partially restarting the computing device conditioned on the flag indicating the need to partially reboot, partially restarting including sequentially restarting the set of computing components without powering up the computing device again. An apparatus, system, and computer program product for performing a similar method are also provided.

14 Claims, 2 Drawing Sheets

(56) References Cited

U.S. PATENT DOCUMENTS

| | | | | |
|---|---|---|---|---|
| 2004/0031030 A1* | 2/2004 | Kidder | ............... | G06F 1/14 |
| | | | | 717/172 |
| 2004/0243978 A1* | 12/2004 | Walmsley | ............ | B41J 2/04505 |
| | | | | 717/120 |
| 2012/0017114 A1* | 1/2012 | Timashev | ........... | G06F 11/1469 |
| | | | | 714/15 |
| 2013/0061216 A1* | 3/2013 | Adler | ................ | G06F 1/1626 |
| | | | | 717/173 |

OTHER PUBLICATIONS

Dmitry V. Krivenok, et al.; "Boot Blocking of Virtual Storage Appliance," U.S. Appl. No. 15/142,808, filed Apr. 29, 2016.

\* cited by examiner

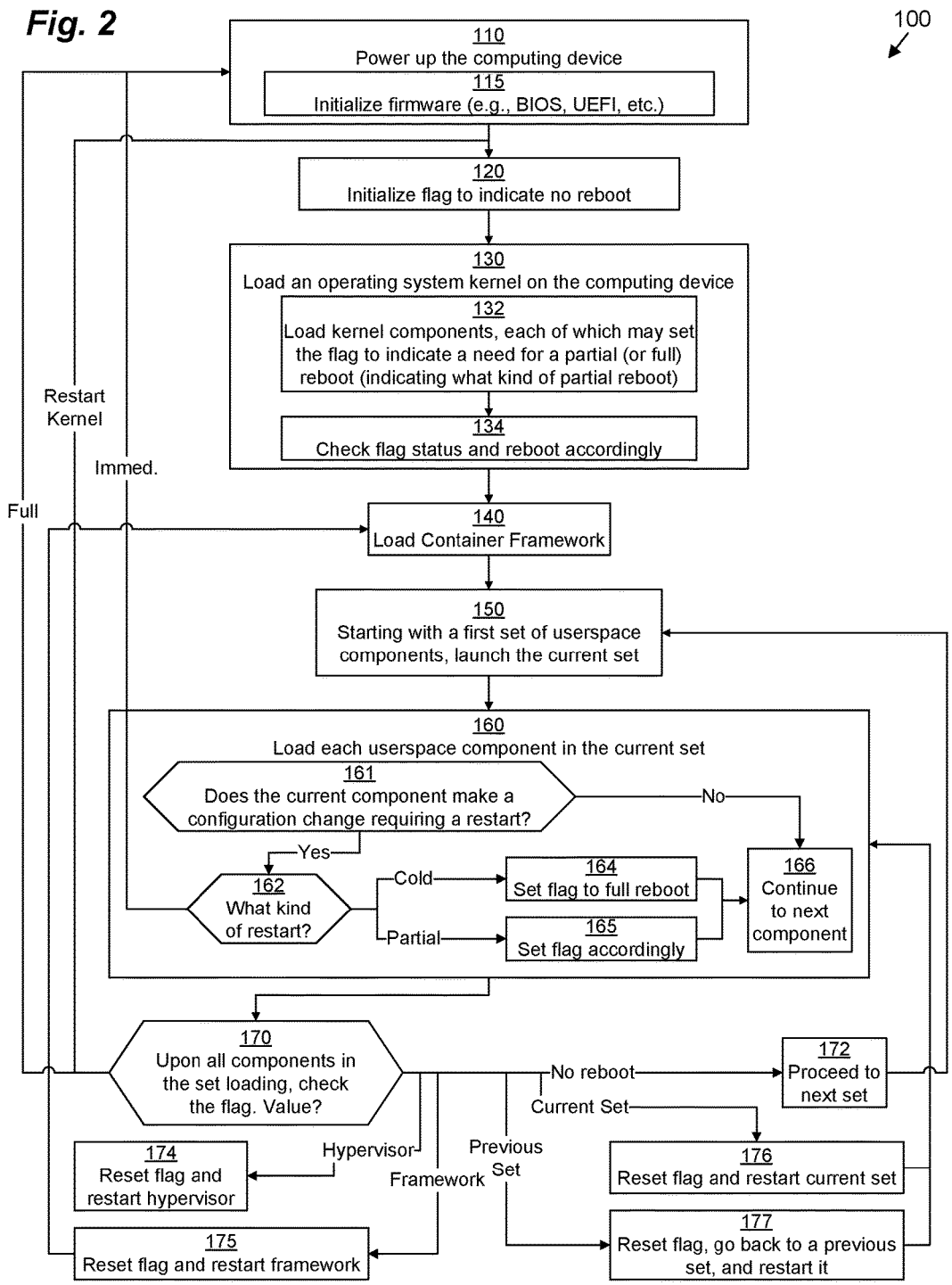

TECHNIQUES FOR PARTIALLY RESTARTING A COMPUTING DEVICE IN RESPONSE TO A CONFIGURATION CHANGE

BACKGROUND

Computers have revolutionized the modern world. We find computers and other computing devices in almost every aspect of our lives today. They are used for personal and business document creation, entertainment content creation, entertainment viewing, information processing, communication, information retrieval and search, education, commerce, banking, etc. They are found in various configurations from large rack-mounted server systems to smaller workstations, desktop computers, portable laptops, and ubiquitous tablets and smart phones.

Every so often a computing device must be shut down in order to upgrade its software or hardware. Doing so results in one or more configuration changes being made to the computing device.

SUMMARY

Unfortunately, the above-described techniques may suffer from deficiencies. Often when a computing device is rebooted, various software components that are loaded upon booting may make configuration changes to the device. In a typical configuration, upon each component making a configuration change, the system is immediately rebooted to allow the configuration change to take effect. However, if several components need to make configuration changes, this may result in the computing device needing to reboot several times in order to be fully configured properly. This may be particularly noticeable when a complex computing device takes several minutes to boot; rebooting several times may leave the computing device offline for 30 minutes or more. This unavailability can be problematic since services provided by the computing device may be essential or time-sensitive. Even if there is a redundant sibling device available to take over when one computing device is off, the long period of unavailability may leave the clustered system susceptible to failure of the normally redundant sibling.

This problem may be reduced by configuring the computing device to wait until all components have loaded and made their respective configuration changes prior to rebooting the device. This approach may reduce the downtime by allowing the device to only need to reboot once or twice instead of many more times. A similar approach is described in U.S. patent application Ser. No. 14/871,740 filed Sep. 30, 2015 listing Brandon Myers, Phillip H. Lee, Michael L. Burriss, and Brion Philbin as inventors. The entire content and teaching of that Application are hereby incorporated herein.

However, even rebooting an extra one or two times may still provide 10 minutes of downtime, which may be unacceptable in many contexts (e.g., payment processing, online banking, intrusion detection, home security, etc.). Thus, it would be desirable to further limit the amount of downtime caused by rebooting due to configuration changes made upon starting a computing device. This result may be accomplished by only partially restarting the computing device and certain aspects of its software components, reducing the amount of time the device must spend rebooting. For example, firmware re-initialization may take several minutes, but it is rarely needed in response to a configuration change. Similarly, many configuration changes within a user-level software library stack may not require the kernel to restart. Thus, whenever a component makes a configuration change, it may set a flag indicating that only a partial restart is needed, allowing the lengthy firmware initialization and/or kernel loading to be skipped. In some embodiments, a more complex flag, such as an enumeration or bitmask may be used allowing the device to selectively shorten the restart process depending on what type of changes are made. In some embodiments, components may be grouped together into containers so only individual containers need to be restarted upon a member of that container or a related container making a configuration change.

In one embodiment, a method of initializing a computing device is performed. The method includes (a) powering up the computing device, (b) initially setting a flag to indicate no need to reboot the computing device, (c) sequentially starting a set of computing components operating on the computing device, (d) in response to one component of the set making a configuration change to the computing device, setting a flag to indicate a need to partially reboot the computing device, and (e) upon all components of the set of components completing to load, partially restarting the computing device conditioned on the flag indicating the need to partially reboot, partially restarting including restarting the set of computing components without powering up the computing device again. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 2 is a flowchart depicting example methods for use in connection with various embodiments.

DETAILED DESCRIPTION

Figure 1:
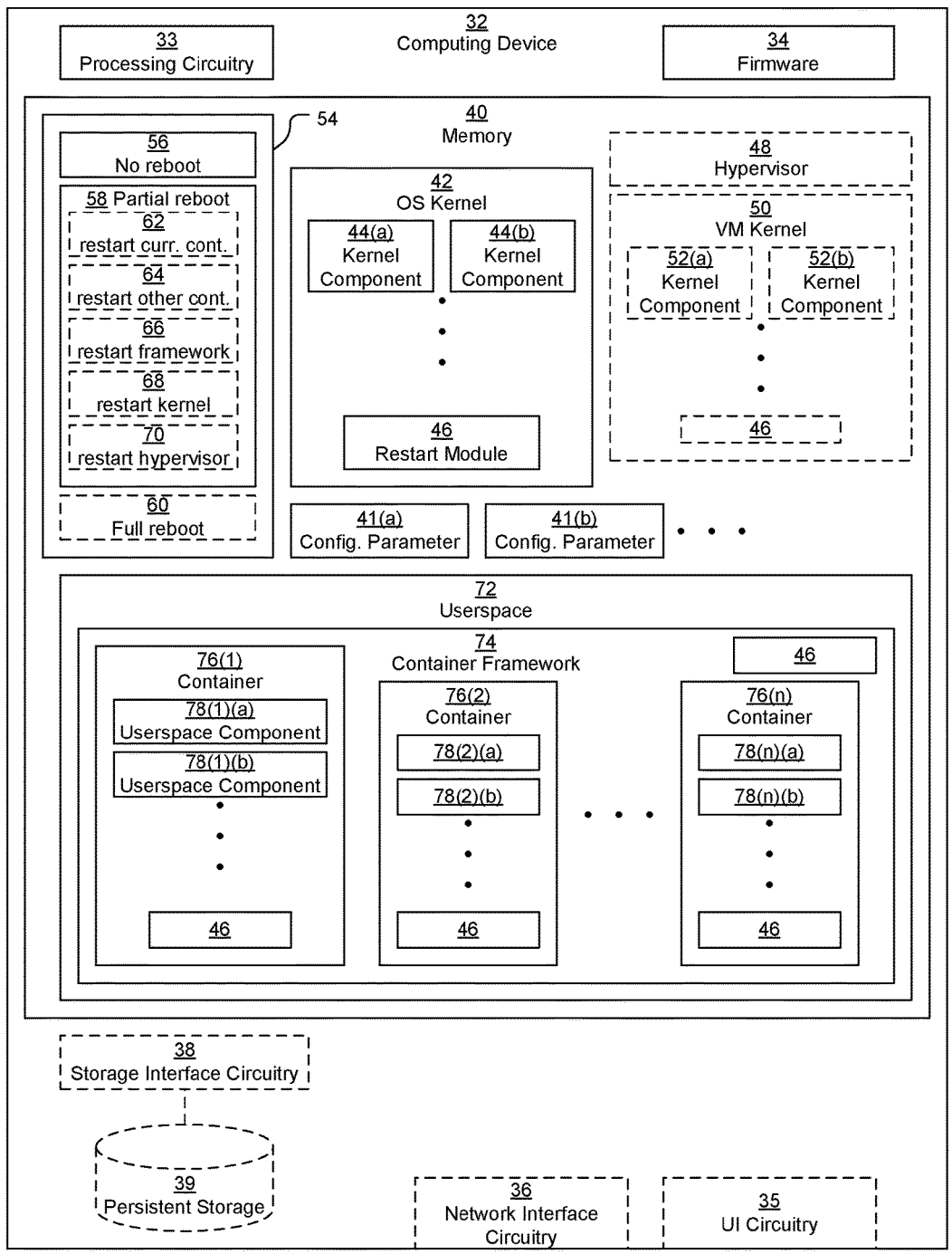
FIG. 1 is a block diagram depicting an example system and apparatus for use in connection with various embodiments.

Embodiments are directed to techniques for limiting the amount of downtime caused by rebooting due to configuration changes made upon starting a computing device. This result may be accomplished by only partially restarting the computing device and certain of its software components, reducing the amount of time the device must spend rebooting. For example, firmware re-initialization may take several minutes, but it is rarely needed in response to a configuration change. Similarly, many configuration changes within a user-level software library stack may not require the kernel to restart. Thus, whenever a component makes a configuration change, it may set a flag indicating that only a partial restart is needed, allowing the lengthy firmware initialization and/or kernel loading to be skipped. In some embodiments, a more complex flag may be used allowing the device to selectively shorten the restart process depending on what type of changes are made. In some embodiments, components may be grouped together into containers so only individual containers need to be restarted upon a member of that container or a related container making a configuration change.

FIG. 1 depicts a system 30. System 30 includes a computing device 32. In some embodiments, system 30 may also include one or more other devices connected to computing device 32 over a network (not depicted) via optional network interface circuitry 36. Computing device 32 may be any kind of computing device, such as, for example, a personal computer, workstation, server computer, enterprise server, laptop computer, tablet computes, smart phone, mobile computer, etc. Typically, a computing device 32 is a server computer, an enterprise server, or a workstation.

Computing device 32 includes processing circuitry 33, firmware 34, and memory 40. In some embodiments, computing device 32 may also include user interface (UI) circuitry 35 for interfacing with a user (e.g., via a monitor display, speakers, keyboard, mouse, etc.), network interface circuitry 36, and storage interface circuitry 38 configured to control and communicate with persistent storage 39. Persistent storage 39 may include any kind of persistent storage devices, such as, for example, hard disk drives, solid-state storage devices, flash drives, etc. Storage interface circuitry 38 may include, for example, a SCSI, SAS, ATA, SATA, Fibre Channel (FC), or other similar controller and ports.

Processing circuitry 33 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Network interface circuitry 36 may include one or more Ethernet cards, cellular modems, FC adapters, Wireless Fidelity (Wi-Fi) wireless networking adapters, and other devices for connecting to a network. Firmware 34 includes circuitry aside from processing circuitry 33 and embedded software that are involved in starting up and running computing device 32. Firmware 34 may include non-volatile memory or Read Only Memory (ROM) serving as a Basic Input/Output System (BIOS) or Unified Extensible Firmware Interface (UEFI) compatible bootstrap code as is well-known in the art.

Memory 40 may be any kind of digital system memory, such as, for example, random access memory (RAM). Memory 40 stores one or more operating systems (OSes) in operation (e.g., Linux, UNIX, Windows, MacOS, or a similar operating system; only the OS kernel 42 is depicted), various applications executing on processing circuitry 33 (e.g., hypervisor 48, various userspace components 78, various restart modules 46, and their component modules, etc.) as well as data used by those applications. Memory 40 also stores a partial restart flag 54 and several configuration parameters 41 (depicted as configuration parameters 41(a), 41(b), . . . ).

In some embodiments, memory 40 may also include a persistent storage portion (not depicted). Persistent storage portion of memory 40 may be made up of one or more persistent storage devices, such as, for example, disks. Persistent storage of memory 40 or persistent storage 39 is configured to store programs and data even while the computing device 32 is powered off. The OS and the applications are typically stored in persistent storage 39 so that they may be loaded into a system portion of memory 40 from persistent storage upon a system restart. These applications, when stored in non-transient form either in the volatile portion of memory 40 or in persistent storage 39 or in persistent portion of memory 40, form a computer program product. The processing circuitry 33 running one or more of these applications thus forms a specialized circuit constructed and arranged to carry out the various processes described herein.

In some embodiments computing device 32 may run a hypervisor 48, such as, for example, ESXi provided by VMware, Inc. of Palo Alto, Calif. Hypervisor 48 is configured to allow various virtual machine (VM) kernels 50 (which are OS kernels running within the context of hypervisor 48) to execute on processing circuitry within a virtualized environment, as is well-known in the art. Thus, hypervisor 48 presents a virtual operating platform on which one or more VM kernels 50 may run. In some embodiments in which hypervisor 48 runs on computing device 32, it may take the place of OS kernel. In other embodiments, OS kernel 42 runs directly on processing circuitry to provide the OS to users and applications. Applications typically operate within userspace 72. OS kernel 42 may include a set of kernel components 44 (depicted as kernel components 44(a), 44(b), . . . ). Kernel components 44 may include system drivers as well as other system-level processes and libraries. VM kernel 50 also include a set of kernel components 52 (depicted as kernel components 52(a), 52(b), . . . ). Kernel components 52 may include system drivers as well as other system-level processes and libraries. Both OS kernel 42 and VM kernel 50 may also include a restart module 46 configured to determine, with reference to a setting of flag 54, whether or not the respective OS kernel 42 or VM kernel 50 needs to restart itself or if firmware 34 needs to be re-initialized (i.e., a cold reboot of computing device 32).

A container framework 74 may operate within userspace 72. Container framework is a piece of software which may launch and manage various containers 76 (depicted as container 76(1), 76(2), . . . , 76(n)). Each container 76 may itself launch a set of userspace components 78 (depicted as userspace components 78(1)(a), 78(1)(b), . . . within container 76(1); userspace components 78(2)(a), 78(2)(b), . . . within container 76(2); and userspace components 78(n)(a), 78(n)(b), . . . within container 76(n)). Userspace components 78 may include userspace-level background processes and libraries, and related userspace components 78 may be grouped into containers 76. For example, userspace components 78 relating to establishing block-level storage services may be grouped into container 76(1), while userspace components 78 relating to establishing file-level storage services may be grouped into container 76(2).

Each container 76 may also include a restart module 46 configured to determine, with reference to a setting of flag 54, whether or not that respective container 76 needs to restart itself. Container framework 74 may also include a restart module 46 configured to determine, with reference to a setting of flag 54, whether or not a specific previously-loaded container 76 needs to be restarted, whether the container framework 74 itself needs to be restarted, whether or not the OS kernel 42 (or VM kernel 50 if the userspace 72 is within a VM) needs to be restarted, or whether or not firmware 34 needs to be re-initialized (i.e., a cold reboot of computing device 32). In some embodiments, if userspace 72 is within a VM, restart module 46 operating within container framework 74 may also be configured to determine whether or not hypervisor 48 needs to be restarted.

Flag 54 has at least two possible states: a no reboot state 56 and a partial reboot state 58. In some embodiments, flag 54 also has a full reboot state 60. When flag 54 is in the no reboot state 56, if a restart module 46 is invoked, it will refrain from rebooting or restarting any previously-loaded part of computing device 32. When flag 54 is in the full reboot state 60, if a restart module 46 is invoked, it will activate a cold (i.e., full) reboot of computing device 32, which involves cutting power and re-initializing the firmware 34. When flag 54 is in a partial reboot state 58, if a restart module 46 is invoked, it will restart at least one previously-loaded software aspect of computing device 32 but it will not re-initialize the firmware 34.

In some embodiments, there may be several different partial reboot states 58 including one or more of a restart current container state 62, a restart other container state 64, a restart current container state 62, a restart framework state 66, a restart kernel state 68, and a restart hypervisor state 62. There may also be other partial reboot states 58.

When flag 54 is in the restart current container state 62, once all userspace components 78 within a particular container 76(x) have loaded, restart module 46 of that particular container 76(x) may detect that the flag 54 is in the restart current container state 62, causing restart module 46 of that particular container 76(x) to unload all components 78 of that particular container 76(x) and cause the components 78 of that particular container 76(x) to reload.

When flag 54 is in the restart other container state 64, once all userspace components 78 within a particular container 76(x) have loaded and restart module 46 of that particular container 76(x) has refrained from initiating any restart, prior to proceeding to the next container 76(x+1), operation passes to restart module 46 of container framework 74. Restart module 46 of container framework 74 may detect that the flag 54 is in the restart other container state 64, causing restart module 46 of container framework 74 to unload all components 78 of a previously-loaded container 76(y) and cause the components 78 of that previously-loaded container 76(y) to reload. In some embodiments, there may be a separate restart other container state 64 associated with each container 76 (causing restart module 46 of container framework 74 to restart that container 76), while in other embodiments, there may be a separate pointer or set of pointers (not depicted) to one or more particular containers 76 that indicates which previously-loaded container 76(y) should be reloaded.

When flag 54 is in the restart framework state 66, once all userspace components 78 within a particular container 76(x) have loaded and restart module 46 of that particular container 76(x) has refrained from initiating any restart, prior to proceeding to the next container 76(x+1), operation passes to restart module 46 of container framework 74. Restart module 46 of container framework 74 may detect that the flag 54 is in the restart framework state 66, causing restart module 46 of container framework 74 to unload all userspace components 78 of all containers 76 of the container framework 74. Then container framework 74 may relaunch its containers 76.

When flag 54 is in the restart kernel state 68, once all userspace components 78 within a particular container 76(x) have loaded and restart module 46 of that particular container 76(x) has refrained from initiating any restart, prior to proceeding to the next container 76(x+1), operation passes to restart module 46 of container framework 74. Restart module 46 of container framework 74 may detect that the flag 54 is in the restart kernel state 68, causing restart module 46 of container framework 74 to initiate a warm restart, restarting OS kernel 42 (or VM kernel 50, as appropriate). Restart module 46 of OS kernel 42 or VM kernel 50 may also initiate a respective restart of the OS kernel 42 or VM kernel 50 after all kernel components 44 or 52 have loaded if flag 54 is in the restart kernel state 68.

When flag 54 is in the restart hypervisor state 70, once all userspace components 78 within a particular container 76(x) have loaded and restart module 46 of that particular container 76(x) has refrained from initiating any restart, prior to proceeding to the next container 76(x+1), operation passes to restart module 46 of container framework 74. Restart module 46 of container framework 74 may detect that the flag 54 is in the restart hypervisor state 70, causing restart module 46 of container framework 74 to initiate a virtual environment restart, restarting hypervisor 48. Restart module 46 of VM kernel 50 may also initiate a restart of the VM kernel 50 after all kernel components 52 have loaded if flag 54 is in the restart hypervisor state 70.

In on embodiment, VM kernel 50 may function, for example, as a virtual storage processor, which is configured to present access to a set of virtual disks (not depicted) to remote hosts (not depicted). Each virtual disk may be backed by persistent storage 39. The virtual disks are all logically created and presented to the VM kernel 50 by hypervisor 48.

FIG. 2 illustrates an example method 100 performed by computing device 32. It should be understood that any time a piece of software (e.g., restart module 46; kernel 42, 50; hypervisor 48; kernel component 44, 52; userspace component 76; container framework 74; etc.) is described as performing a method, process, step, or function, in actuality what is meant is that the computing device 32 on which that piece of software is running performs the method, process, step, or function when executing that piece of software on its processing circuitry 33.

It should be understood that, within FIG. 2, one or more of the steps or sub-steps may be omitted. Similarly, in some embodiments, one or more steps or sub-steps may be combined together or performed in a different order. Method 100 is performed by computing device 32, more specifically by processing circuity 33 in conjunction with various other system components.

Preliminarily, before step 110, a user may make a hardware change to the computing device 32, such as, for example, by flipping a hardware switch on a motherboard, expansion card, or daughter card of the computing device; by running an electronic hardware configuration menu to change a hardware setting; or by inserting a new hardware component (e.g., installing an expansion card into an expansion bus slot, installing a memory module into a memory expansion slot, installing a new internal hard disk drive, etc.). One example is installing a new network adapter card in a PCI or PCI Express slot. Another example is installing a new storage adapter card in a PCI or PCI Express slot. These changes may later cause one or more components 44, 52, 78 to update one or more configuration parameters 41 that may necessitate a full or partial restart. In one embodiment, the configuration change may include making the installed network adapter card available to the computing device 32 for communicating with a network as the network interface circuitry 36. In another embodiment, the configuration change may include making the installed storage adapter card available to the computing device 32 for communicating with persistent storage 39 as the storage interface circuitry 38.

In step 110, the computing device powers up. Step 110 may include sub-step 115, in which the firmware 34 is initialized (or re-initialized if previously initialized). This may also include performing a power-on self-test (POST).

In step 120, since the computing device 32 has just started, flag 54 should be initialized to a no reboot state 56 in case it was previously in another state.

In some embodiments (not depicted), after step 120, computing device 32 may load hypervisor 48.

In step 130, computing device 32 loads an OS kernel 42 (or, if hypervisor 48 is already running, it may instead load one or more VM kernels 52). Step 130 may include sub-steps 132 and 134.

In sub-step 132, OS kernel 42 (or VM kernel 50, but henceforth step 130 will be representatively described only in the context of OS kernel 42) loads the kernel components 44. As each kernel component 44 is loaded, if it makes a change to firmware 34 or a configuration parameter 41 that necessitates a restart of some sort, it will set the flag 54 accordingly (see step 160 below for more detail on how userspace components 78 do this in an analogous manner). Thus, for example, in one embodiment, if the kernel component 44 makes a change to code in the firmware 34, it will set the flag 54 to the full reboot state 60. As another example, in one embodiment if the kernel component 44 makes a change to a configuration parameter 41 that affects how the OS kernel 42 is loaded or how a previously-loaded kernel component 44 is configured, it will set the flag 54 to the restart kernel state 68. In embodiments in which flag 54 does not have many states, any change that affects the OS kernel 42 will cause the flag 54 to be set to the partial reboot state 58.

In sub-step 134, after all of the kernel components 44 have loaded, restart module 46 of OS kernel 42 checks the flag 54 to determine if any kind of restart is needed. If flag 54 is in the full reboot state 60, then restart module 46 initiates a cold reboot, temporarily cutting power to the computing device 32, causing the firmware 34 to have to re-initialize (e.g., returning to step 110). If flag 54 is in the restart kernel state 68, then restart module 46 initiates a warm reboot, causing the OS kernel 42 to reload (e.g., returning to step 120). In embodiments in which step 130 is performed by a VM kernel 50, then, if flag 54 is in the restart hypervisor state 70, then restart module 46 restarts the hypervisor 48 (e.g., returning to step 120 and re-loading the hypervisor 48 prior to repeating step 130). Otherwise, if flag 54 is in the no reboot state 56, then restart module 46 allows execution to pass on to step 140.

In step 140, once the OS kernel 42 has fully loaded, userspace comes into being and computing device 32 loads the container framework 74 within userspace 72.

In step 150, starting with a first container 76($x$=1), container framework 74 launches the current container 76($x$).

In step 160, for the current container 76($x$), container framework 74 loads each userspace component 78 within that container 76($x$), typically in a pre-defined sequence, although, in some embodiments, some of the userspace components 78 may load in parallel. In some embodiments, step 160 may include sub-steps 161-166, although in other embodiments an equivalent determination may be made in a different order.

In sub-step 161, starting with a first userspace component 76($x$)($y$=1), container framework 74 determines whether or not the current userspace component 76($x$)($y$) has made a change to a configuration parameter 41 (or the firmware 34) that necessitates a restart. If not operation proceeds with sub-step 166, in which the next userspace component 78($x$)($y$+1) is loaded, returning to sub-step 161 without modifying the state of the flag 54. It should be noted that if userspace components 78 load in parallel, the "next" userspace component 78 may actually include several dependent userspace components 78 loading in parallel. However, step 160 still applies to each userspace component 78 as it is loaded, regardless of the order.

If, in step 161, container framework 74 determines that the current userspace component 76($x$)($y$) has made a change that necessitates a restart, then operation proceeds with sub-step 162. In sub-step 162, container framework 74 determines what type of restart has been made necessary by the configuration change. If an immediate reboot is needed, operation may return back to step 110 for an immediate cold reboot. If an immediate restart is not needed, but a cold restart is needed, operation proceeds with sub-step 164. Otherwise, if a partial restart is needed, operation proceeds with sub-step 165.

In sub-step 164, container framework 74 sets flag 54 to the full reboot state 60 and then proceeds to step 166 to continue on to the next component 76($x$)($y$+1).

In sub-step 165, container framework 74 sets flag 54 to a partial reboot state 58 (unless it is already in the full reboot state 60) and then proceeds to step 166 to continue on to the next component 76($x$)($y$+1) (or several dependent userspace components 76). In some embodiments, a particular state 62-70 is set, depending on the type of configuration change. However, the state of the flag 54 is never lowered except when it is re-initialized on a restart. Thus, the flag 54 may ascend from state to state in the following order, never going backwards, but skipping states is permitted: state 56→58 (62→64→66→68→70)→60. Thus a transition from state 62 to state 68 is possible, but a transition from state 66 to state 62 is not permitted.

In step 170, once all userspace components 78 for the current container 76($x$) have loaded, restart module 46 of the current container 76($x$) checks the flag 54 to determine if any kind of restart is needed. If flag 54 is in the full reboot state 60, then restart module 46 initiates a cold reboot, temporarily cutting power to the computing device 32, causing the firmware 34 to have to re-initialize (e.g., returning to step 110). If flag 54 is in the restart current container state 62, operation proceeds with step 176 in which restart module 46 of the current container 76($x$) resets flag 54 to the no reboot state 56 and causes all of the userspace components 78 of the current container 76($x$) to unload and then returns to step 160 to reload all of the userspace components 78 of the current container 76($x$).

If flag 54 is in the restart other container state 64, operation proceeds with step 177 in which restart module 46 of the current container 76($x$) (or, in some embodiments, restart module 46 of the container framework 74) resets flag 54 to the no reboot state 56 and returns to a previously-loaded container 76($z$), $z<x$, and then returns to step 160 to reload all of the userspace components 78 of that previously-loaded container 76($z$). The particular previously-loaded container 76($z$) may either be selected with reference to a per-container state of the flag 54 or with reference to a pointer to the particular previously-loaded container 76($z$). In some embodiments, after the previously-loaded container 76($z$) is restarted, all containers 76($v>z$) that would normally start after container 76($z$) may also be restarted (if they had previously been loaded). In other embodiments, other previously loaded containers 76 are only restarted after container 76($z$) is restarted if they are marked as being dependent on it.

If flag 54 is in the restart framework state 66, operation proceeds with step 175 in which restart module 46 of the current container 76($x$) (or, in some embodiments, restart module 46 of the container framework 74) resets flag 54 to the no reboot state 56 and resets the entire container framework, returning to step 140.

If flag 54 is in the restart kernel state 68, operation proceeds with step 120 in which restart module 46 of the current container 76($x$) (or, in some embodiments, restart module 46 of the container framework 74) initiates a warm reboot to restart the OS kernel 42 or VM kernel 50.

If flag 54 is in the restart hypervisor state 70, operation proceeds with step 174 in which restart module 46 of the current container 76($x$) (or, in some embodiments, restart module 46 of the container framework 74) resets flag 54 to the no reboot state 56 and restarts hypervisor 48, then proceeding back to step 130 to reload one or more VM kernels 50 in step 130.

Finally, if flag 54 is in the no reboot state 56, operation proceeds with step 172 in which restart module 46 of the container framework 74 leaves the flag 54 as-is and proceeds to the next container 76(x+1), returning to step 150 for the new container 76(x+1) until there are no more remaining containers 76 (e.g., once container 76(n) has loaded), at which point all components 78 have been loaded, method 100 terminates, and the boot process has successfully completed. It should be understood that, although containers 76 have been described as loading sequentially, in some embodiments, some containers 76 may load in parallel with each other. In these embodiments, different instances of steps 150-172 may operate in parallel on different containers 76 loading in parallel.

Thus, techniques have been presented for limiting the amount of downtime caused by rebooting due to configuration changes made upon starting a computing device 32. This result may be accomplished by only partially restarting the computing device 32 and certain of its software components, reducing the amount of time the device 32 must spend rebooting. For example, firmware 34 re-initialization may take several minutes, but it is rarely needed in response to a simple configuration change. Similarly, many configuration changes within a user-level software library stack may not require the kernel 42, 50 to restart. Thus, whenever a component 44, 52, 78 makes a configuration change, it may set a flag 54 indicating that only a partial restart (state 58) is needed, allowing the lengthy firmware 34 initialization and/or kernel 42, 50 loading to be skipped. In some embodiments, a more complex flag 54 may be used allowing the device to selectively shorten the restart process depending on what type of changes are made. In some embodiments, components 78 may be grouped together into containers 76 so only individual containers 76 need to be restarted upon a member of that container 76 or a related container 76 making a configuration change.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of initializing a computing device, the method comprising:
    upon the computing device powering up:
        initially setting a flag to indicate no need to restart the computing device;
        sequentially starting a set of computing components operating on the computing device;
        in response to one component of the set making a configuration change to the computing device, setting the flag to indicate a need to partially restart the computing device; and
        upon all components of the set of components completing to load, partially restarting the computing device conditioned on the flag indicating the need to partially restart, partially restarting including restarting the set of computing components without powering up the computing device again; and
    upon partially restarting the computing device:
        another component of the set of components making another configuration change to the computing device;
        in response to the other component making the other configuration change, determining whether the other configuration change necessitates no reboot, a partial reboot, or a full reboot;
        in response to determining that the other configuration change necessitates a full reboot, setting the flag to indicate a need to fully reboot the computing device; and
        upon all components of the set of components completing to load, fully rebooting the computing device conditioned on the flag indicating the need to fully reboot, fully rebooting including powering up the computing device again.

2. The method of claim 1 wherein:
    the method further comprises, upon powering up the computing device, initializing firmware of the computing device;
    the method further comprises loading an operating system kernel on the computing device after initializing the firmware and prior to sequentially starting the set of computing components; and
    partially restarting further includes restarting the operating system kernel.

3. The method of claim 1 wherein:
    the method further comprises, after initializing the firmware and prior to sequentially starting the set of computing components:
        loading an operating system kernel on the computing device; and
        loading a container framework within a user space, the container framework being configured to launch a plurality of sets of components including the set of components; and
    partially restarting further includes restarting the container framework without restarting the operating system kernel.

4. The method of claim 1 wherein:
    the method further comprises, after initializing the firmware and prior to sequentially starting the set of computing components:
        loading an operating system kernel on the computing device; and loading a container framework within a user space, the container framework being configured to launch a plurality of sets of components including the set of components; and partially restarting further includes the container framework directing another set of components of the set of components to restart.

5. The method of claim 1 wherein:

the method further comprises, upon powering up the computing device, initializing firmware of the computing device;

the method further comprises loading a hypervisor on the computing device after powering up the computing device and prior to sequentially starting the set of computing components; and partially restarting further includes restarting the hypervisor.

6. The method of claim 1 wherein:

the method further comprises, after initializing the firmware and prior to sequentially starting the set of computing components:
  loading a hypervisor on the computing device; and
  loading a guest operating system kernel as a virtual machine managed by the hypervisor; and partially restarting further includes restarting the guest operating system kernel without restarting the hypervisor.

7. The method of claim 1 wherein:

the method further comprises communicatively attaching a network adapter card to the computing device prior to powering up the computing device; and making the configuration change includes making the network adapter card available to the computing device for communicating with a network.

8. The method of claim 1 wherein:

the method further comprises communicatively attaching a storage adapter card to the computing device prior to powering up the computing device; and making the configuration change includes making the storage adapter card available to the computing device for communicating with persistent storage devices.

9. The method of claim 1 wherein:

the method further comprises installing new hardware on the computing device prior to powering up the computing device; and making the configuration change includes making the new hardware available to the computing device.

10. An apparatus comprising processing circuitry coupled to memory configured to:

upon powering up the apparatus:
  initially set a flag to indicate no need to restart the apparatus;
  sequentially start a set of computing components operating on the apparatus;
  in response to one component of the set making a configuration change to the apparatus, set the flag to indicate a need to partially restart the apparatus; and
  upon all components of the set of components completing to load, partially restart the apparatus conditioned on the flag indicating the need to partially restart, partially restarting including restarting the set of computing components without powering up the apparatus again; and upon partially restarting the apparatus:
  another component of the set of components making another configuration change to the apparatus;
  in response to the other component making the other configuration change, determine whether the other configuration change necessitates no reboot, a partial reboot, or a full reboot;
  in response to determining that the other configuration change necessitates a full reboot, set the flag to indicate a need to fully reboot the apparatus; and
  upon all components of the set of components completing to load, fully reboot the apparatus conditioned on the flag indicating the need to fully reboot, fully rebooting including powering up the apparatus again.

11. The apparatus of claim 10 wherein:

the apparatus further includes an expansion bus slot;

the one component is configured to make the configuration change in response to a network adapter card having been inserted into the expansion bus slot prior to the apparatus being powered up; and making the configuration change includes making the network adapter card available to the apparatus for communicating with a network.

12. The apparatus of claim 10 wherein:

the apparatus further includes an expansion bus slot and a set of persistent storage devices;

the one component is configured to make the configuration change in response to a storage adapter card having been inserted into the expansion bus slot prior to the apparatus being powered up; and making the configuration change includes making the storage adapter card available to the apparatus for communicating with the set of persistent storage devices.

13. The apparatus of claim 10 wherein:

the apparatus further includes an expansion bus slot;

the one component is configured to make the configuration change in response to an expansion card having been inserted into the expansion bus slot prior to the apparatus being powered up; and making the configuration change includes making the expansion card available to the apparatus.

14. A computer program product comprising a non-transitory computer-readable storage medium storing a set of instructions, which, when executed by a computing device cause the computing device to initialize by:

upon powering up the computing device:
  initially setting a flag to indicate no need to restart the computing device;
  sequentially starting a set of computing components operating on the computing device;
  in response to one component of the set making a configuration change to the computing device, setting the flag to indicate a need to partially restart the computing device; and
  upon all components of the set of components completing to load, partially restarting the computing device conditioned on the flag indicating the need to partially restart, partially restarting including restarting the set of computing components without powering up the computing device again; and upon partially restarting the computing device:
  another component of the set of components making another configuration change to the computing device;
  in response to the other component making the other configuration change, determining whether the other configuration change necessitates no reboot, a partial reboot, or a full reboot;

in response to determining that the other configuration change necessitates a full reboot, setting the flag to indicate a need to fully reboot the computing device; and upon all components of the set of components completing to load, fully rebooting the computing device conditioned on the flag indicating the need to fully reboot, fully rebooting including powering up the computing device again.

\* \* \* \* \*